(12) United States Patent
Hildenbrand (10) Patent No.: US 11,188,361 B1
(45) Date of Patent: Nov. 30, 2021

(54) CROSS-ARCHITECTURE SOFTWARE DISTRIBUTION USING A VIRTUAL INSTRUCTION SET ARCHITECTURE

(71) Applicant: Red Hat, Inc., Raleigh, NC (US)

(72) Inventor: David Hildenbrand, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/913,441

(22) Filed: Jun. 26, 2020

(51) Int. Cl.
*G06F 9/455* (2018.01)
*G06F 8/41* (2018.01)
*G06F 9/54* (2006.01)
*G06F 9/445* (2018.01)

(52) U.S. Cl.
CPC ............ *G06F 9/45508* (2013.01); *G06F 8/41* (2013.01); *G06F 9/44505* (2013.01); *G06F 9/4552* (2013.01); *G06F 9/542* (2013.01); *G06F 9/546* (2013.01)

(58) Field of Classification Search
CPC ..................................................... G06F 9/445
See application file for complete search history.

(56) References Cited

U.S. PATENT DOCUMENTS

| | | | |
|---|---|---|---|
| 8,327,354 B1* | 12/2012 | Magenheimer | G06F 9/45554 718/1 |
| 9,317,288 B2 | 4/2016 | Henry et al. | |
| 9,405,551 B2 | 8/2016 | Tamada et al. | |
| 9,495,136 B2 | 11/2016 | Schmidt | |
| 9,606,941 B2 | 3/2017 | Maniatis et al. | |
| 9,928,062 B2 | 3/2018 | Azagury et al. | |
| 9,996,396 B2 | 6/2018 | Knowles et al. | |
| 2010/0042983 A1* | 2/2010 | Vick | G06F 9/45516 717/153 |
| 2012/0233610 A1* | 9/2012 | Mandre | G06F 9/4856 718/1 |

OTHER PUBLICATIONS

Cota et al. "Cross-ISA Machine Instrumentation Using Fast and Scalable Dynamic Binary Translation", Apr. 2019, 14 pages, https://www.researchgate.net/publication/332216302_Cross-ISA_machine_instrumentation_using_fast_and_scalable_dynamic_binary_translation.
Adve et al, "LLVA: A Low-Level Virtual Instruction Set Architecture", Computer Science Department, University of Illinois at Urbana-Champaign, Oct. 1, 2003, 12 pages.
WebAssembly High-Level Goals—WebAssembly, accessed Jun. 24, 2020, 3 pages.

* cited by examiner

*Primary Examiner* — Jae U Jeon
(74) *Attorney, Agent, or Firm* — Lowenstein Sandler LLP (57) ABSTRACT

Systems and methods for cross-architecture software distribution using a virtual instruction set architecture. An example method may comprise configuring, by a host computer system, a set of instructions for a virtual instruction set architecture; generating an executable program component using the virtual instruction set architecture for an operating system type; generating an emulator component for the virtual instruction set architecture, the emulator component configured to execute on a target computing system with a target instruction set architecture, wherein the target computing system executes the operating system type, and wherein the target instruction set architecture is different from the virtual instruction set architecture; providing the executable program to the target computing system; and providing the emulator component to the target computing system to cause the target computing system to execute the emulator component responsive to detecting a request to execute the executable program.

20 Claims, 5 Drawing Sheets

CROSS-ARCHITECTURE SOFTWARE DISTRIBUTION USING A VIRTUAL INSTRUCTION SET ARCHITECTURE

TECHNICAL FIELD

The present disclosure is generally related to computer systems, and more particularly, to cross-architecture software distribution in computer systems.

BACKGROUND

Computer software is often distributed to a target computer system as binary code that is configured specifically for the architecture of that target computer system. This is typical for computer programs that are written in compiled languages (such as C, C++, etc.). The binary code (or "binary") is compiled for the hardware architecture and operating system of the target computer system and distributed via a software distribution channel (such as a software package management system, software development pipeline, etc.). In the case of proprietary software, source code is often not available to the target computer system, so only the binary executable code is provided.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for cross-architecture software distribution using a virtual instruction set architecture. Proprietary software that is distributed only in binary form is typically compiled for the specific architecture of the target system. This method of software delivery effectively distributes a binary that executes most efficiently on a target system since the distributed binary is configured to operate using the instruction set architecture (ISA) of that target system. This, however, poses significant challenges to distribution of proprietary software that is intended to be deployed to target systems that operate using different ISAs. In such instances, a software developer would be responsible for recompiling (or "porting") the source code for their application for each architecture to which it would be deployed. Additionally, deploying software to multiple architectures would involve additional testing, packaging, and management of distribution channels for each individual hardware instruction set architecture.

For example, an application program that is compiled for use by a target system configured with an x86 hardware instruction set architecture would be compiled with the specifications associated with the x86 ISA. A program configured in such a way would not function correctly if deployed by a target system that is configured with a different type of hardware since the components of the hardware and the instruction set architecture used to interact with that hardware may not be compatible with that of the x86 ISA. For example, a program compiled using the x86 ISA would not function correctly if deployed to a target system configured using PowerPC hardware. In such instances, the program should be recompiled using the PowerPC ISA. As more and more hardware architectures are developed and deployed, the difficulties with deploying software to those architectures become increasingly complex.

Some conventional software distribution methods address these problems by deploying software using an emulator. In computer systems, an emulator is software that enables one computer system (the "target system" or "host system") to behave like another computer system (the "source system" or "guest system"). An emulator typically enables the target system to run software or use peripheral devices designed for the guest system. Emulation refers to the ability of a computer program to emulate (or imitate) another program or device. Conventional emulators can emulate hardware architecture based on the hardware's instruction set architecture (ISA), so both an executing program and the associated operating system (OS) would then be interpreted by the emulator instead of being executed by native hardware. Some emulators can additionally provide binary translation of instructions. Binary translation is a form of binary recompilation where sequences of instructions are translated from a source instruction set to the target instruction set.

The use of emulators, however, can result in several problems. First, for proprietary software (or software not yet ported to a new architecture), conventional implementations typically deploy a binary targeted for a different ISA through an emulator that may not be optimized for the target system. These ISAs are not typically configured for efficient and accurate emulation and/or binary translation. For example, architecture specific features, ISA instructions and register configuration, and other hardware architecture nuances make it extremely difficult to build, maintain, and support emulators that can consistently perform efficiently and accurately. A small change to a hardware ISA can result in significant performance degradation, data corruption, or execution failure. Additionally, the owners of particular ISAs for conventional hardware architectures have instituted legal barriers that prevent implementation of emulators for many common architectures. Thus, in many cases, emulation may not be a viable option for software across multiple hardware platforms.

Aspects of the present disclosure address the above noted and other deficiencies by implementing cross-architecture software distribution using a virtual instruction set architecture. In particular, a virtual instruction set (vISA) manager can be implemented and configure a virtual instruction set architecture that can be used to drive emulation of executable programs across multiple target hardware architectures.

Notably, the vISA can be configured with instructions that are not specifically tied to any particular target hardware architecture. The vISA manager can configure a set of instructions for a vISA and generate an executable program using the vISA for a particular target operating system. The vISA manager can additionally configure and generate an emulator component that can be used by a target hardware architecture to perform emulation and/or binary translation of the vISA for the executable program. The vISA manager can subsequently deploy the executable program and emulator that are configured for the vISA so that a proprietary binary can be executed by a target hardware architecture.

Aspects of the present disclosure present advantages over conventional solutions to the issues noted above. First, configuring a vISA facilitates improved efficiency for distribution of compiled software across architectures. An application can be compiled once (for the vISA) and deployed across multiple varied target hardware architectures. Additionally, implementing an emulator for the vISA can be particularly configured to avoid error-prone and inefficient emulation of ISAs for existing target architectures. Thus, an emulator configured to emulate the vISA can result in significant performance increases for an emulated program executing on a target ISA. Further, implementing the vISA emulator can facilitate software deployment improvements, since the time necessary to deploy to multiple architectures can be significantly reduced. Moreover, by implementing a vISA, any legal complications associated with emulating ISAs for existing hardware architectures that are owned by other entities (e.g., via copyright and/or patent protection) can be eliminated.

Figure 1:
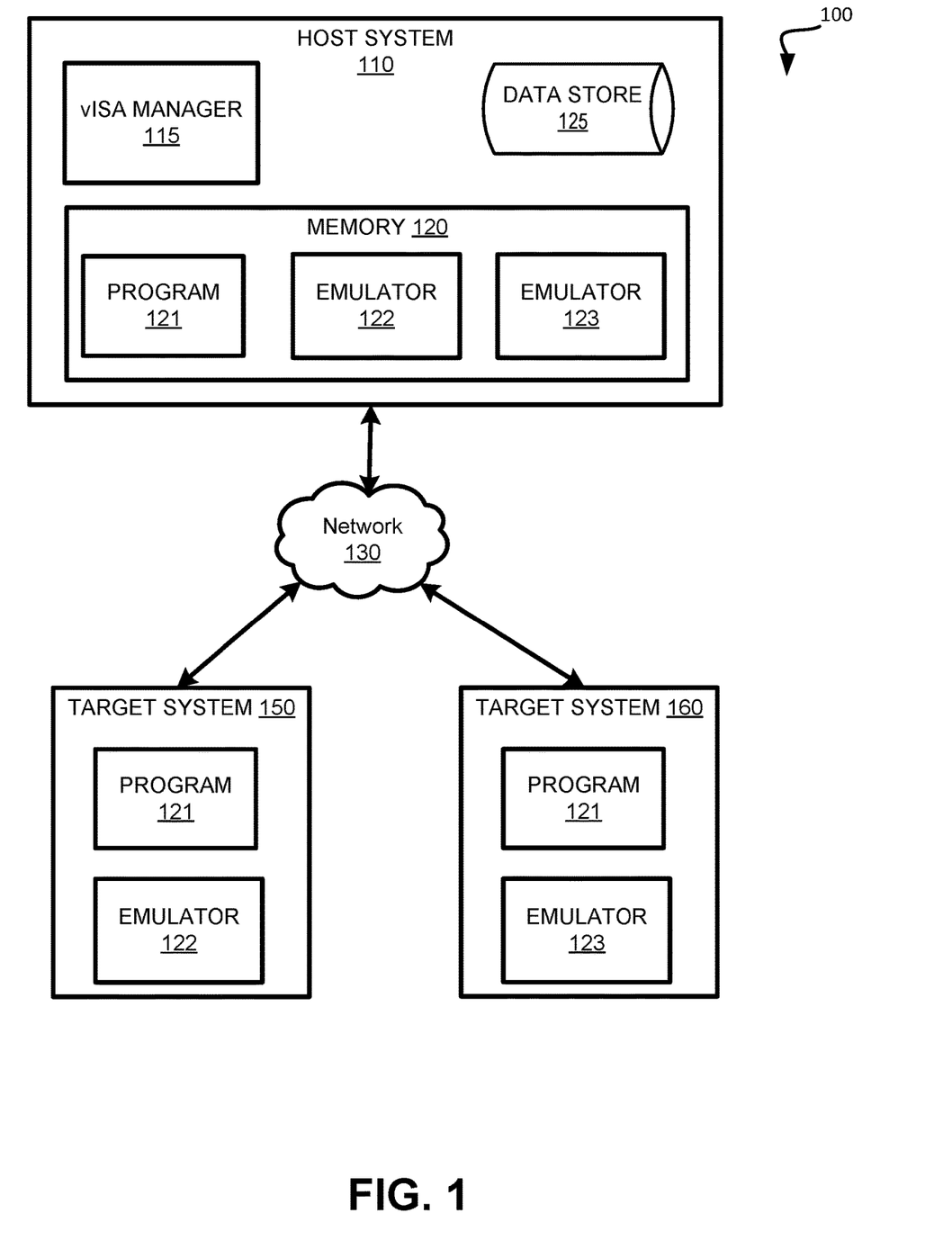
FIG. 1 depicts a high-level component diagram of an example host computer system architecture that performs cross-architecture software distribution using a virtual instruction set architecture, in accordance with one or more aspects of the present disclosure.

FIG. 1 depicts a high-level component diagram of an illustrative example of a computer system 100, in accordance with one or more aspects of the present disclosure. Other architectures for computer system 100 are possible, and implementation of a computer system utilizing examples of the present disclosure is not limited to the specific architecture depicted by FIG. 1.

As shown in FIG. 1, the computer system 100 may include a host system 110 (e.g., a host computer system) and one or more target systems 150, 160 capable of communicating with the host system 110 via a network 130. The network 130 may be a public network (e.g., the Internet), a private network (e.g., a local area network (LAN) or wide area network (WAN)), or a combination thereof. Network 130 may include a wireless infrastructure, which may be provided by one or more wireless communications systems, such as a wireless fidelity (WiFi) hotspot connected with the network 130 and/or a wireless carrier system that can be implemented using various data processing equipment, communication towers, etc. Additionally, or alternatively, network 130 may include a wired infrastructure (e.g., Ethernet).

The host system 110 and the target systems 150, 160 may include one or more processors communicatively coupled to memory devices and input/output (I/O) devices. The host system 110 and the target systems 150, 160 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The host system 110 and/or the target systems 150, 160 may include one or more machines (e.g., one or more server computer systems, routers, gateways, etc.). In some implementations, the host system 110 and/or the target systems 150, 160 can include one or more cloud based servers (such as server systems made accessible to network connectivity via the internet or wireless carrier systems), which may be hosted, for example, by cloud based hosting services.

Host system 110 may include a memory 120, and a data store 125. The data store 125 may share the physical hardware with the host system 110 (one or more hard disk drives, solid-state drives, etc. within the server hardware) or be an independent device coupled to the server system directly or via a network (e.g., as a network-attached storage device (NAS)). Memory 120 may comprise volatile memory devices (e.g., random access memory (RAM)), non-volatile memory devices (e.g., flash memory) and/or other types of memory devices. Memory 120 and/or data store 125 can include areas used to store source code that is subsequently compiled into executable programs (e.g., program 121), instructions for a virtual instruction set architecture, operating system dependency libraries, compiled emulator/binary translator components (e.g., emulator 122), or the like.

Host system 110 may also include a virtual instruction set architecture (vISA) manager 115 that implements cross-architecture software distribution using a vISA. In various implementations, vISA manager 115 can configure a set of instructions for a vISA that can be used for compiling application programs and associated emulator/binary translator components (e.g., program 121 and emulator 122). As noted above, an instruction set architecture (ISA) is an abstract model of a particular computer hardware that can define the supported data types, registers, hardware support for managing main memory fundamental features (such as the memory consistency, addressing modes, virtual memory), and the input/output model of implementations of the ISA. Application programs can be compiled to an architecture-specific format based on the ISA for that hardware architecture.

In various implementations of the present disclosure, the vISA manager 115 can configure instructions a specialized vISA that is optimized for correct and efficient emulation, binary translation, and binary optimization that is not coupled to a particular hardware architecture. Various examples of instructions configured for a vISA are described below with respect to FIG. 2. The vISA manager 115 can use the vISA to generate an executable program component (e.g., program 121) by compiling source code using the vISA for a particular operating system type. Additionally, the vISA manager 115 can generate an emulator component for the vISA (e.g., emulator 122) that is configured to execute on a target computer system (e.g., target system 150), where the target computer system has an ISA that is different from the vISA. In other words, the target computer system can include an ISA for the hardware configuration of that target system, and the emulator component can be configured to execute programs that use the vISA on the target computer system.

For example, if the target computer system is configured with an ISA specific to the x86 hardware architecture, the vISA manager 115 can configure the emulator component to execute programs that are compiled using the vISA on an x86 platform. Moreover, the vISA manager 115 can generate the executable program as well as the emulator component that is to execute that program for the same operating system. In other words, the vISA manager 115 can generate the executable program using the vISA for a particular operating system type. The vISA manager 115 can additionally generate the emulator component to execute that program on the target system for the same operating system type. Continuing the above example, the vISA manager 115 can generate the executable program and the emulator component for a Linux operating system. It should be noted that while Linux has been used to illustrate this example, in other implementations, the executable program and emulator component can be generated for an operating system other than Linux.

The vISA manager 115 can subsequently provide the executable program component and the emulator component to the target systems 150, 160. In various implementations, the components can be provided to the target systems 150, 160 via a software distribution pipeline, a software package manager (e.g., such as Red Hat Package Manager, or the like), via file transfer, or in any other similar manner for software deployment.

Target system 150 can receive the executable program component and emulator component via the software deployment channels noted above and store them (e.g., in a memory, a data store, etc.). In various implementations, when a request is made to execute the program 121, the operating system of the target system 150 can detect that the program 121 is not configured with the ISA of the target system 121. The operating system can then determine that the program 121 is associated with emulator 122 and invoke emulator 122 to facilitate execution of program 121 using the vISA for the operating system of the target system 150.

In an illustrative example, the vISA manager 115 can generate executable program 121 using a vISA for deployment on target systems that execute the Linux operating system. The vISA manager 115 can additionally generate an emulator component 122 for the vISA that is also configured to execute on target systems that use the Linux operating system on a particular hardware architecture (e.g., x86). Thus, when program 121 is initiated on target system 150, the emulator 122 can be invoked to utilize emulation and/or binary translation of the instructions of the vISA that are executed by program 121 for the x86 architecture on target system 150.

In various implementations, the same program 121 can be deployed to an additional target system 160 that may be configured with a different ISA for target system 160's hardware architecture. For example, target system 160 may be configured to execute the Linux operation system on a different hardware architecture (e.g., PowerPC) than that of target system 150 (e.g., x86). The vISA manager 115 can utilize the same process noted above to generate a second emulator component (e.g., emulator 123) that is configured to execute programs that are compiled using the vISA for the target ISA of target system 160. Thus, the vISA manager 115 can generate the emulator 123 to execute programs on the target system 160 for the same operating system type as that used for generating the program to be deployed to target system 160 (e.g., program 121).

Continuing the above example, the vISA manager 115 can generate the emulator component 123 for a Linux operating system that executes on PowerPC. Again, as noted above, that while particular target architectures (x86, PowerPC) and a particular operating system (Linux) have been used to illustrate these examples, in other implementations, the executable program and emulator component can be generated for an operating system other than Linux for target architectures other than x86 and PowerPC. Virtual instruction set architecture manager 115 and its communications with target systems 150 and 160 are described in further detail below with respect to FIGS. 2-4.

Figure 2:
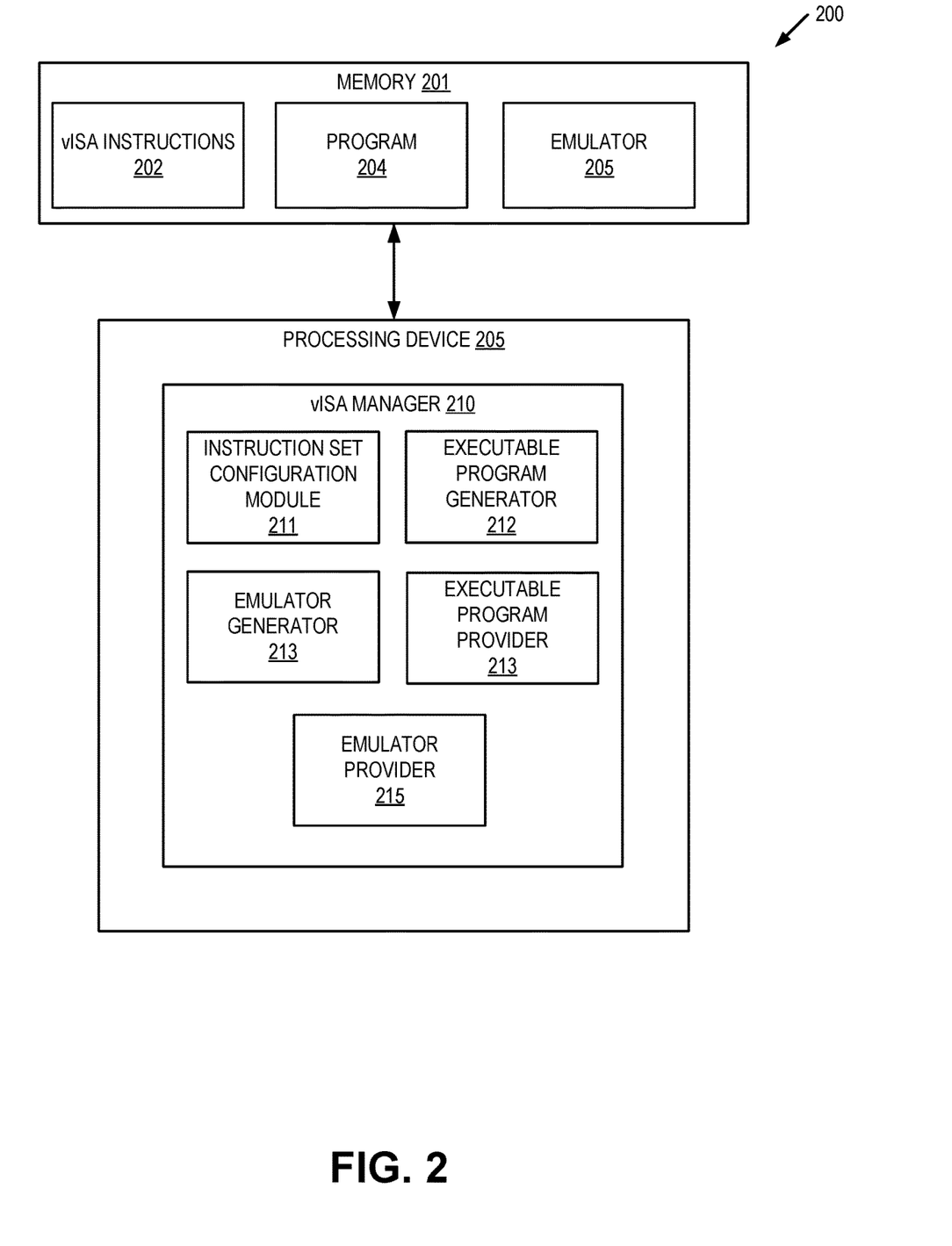
FIG. 2 depicts a block diagram illustrating an example of a virtual instruction set architecture manager for facilitating cross-architecture software distribution, in accordance with one or more aspects of the present disclosure.

FIG. 2 depicts a block diagram illustrating an example of a virtual instruction set architecture manager 210 for facilitating cross-architecture software distribution. In some implementations, virtual instruction set architecture manager 210 may correspond to virtual instruction set architecture manager 115 of FIG. 1. As shown in FIG. 2, virtual instruction set architecture manager 210 may be a component of a computing apparatus 200 that includes a processing device 205, operatively coupled to a memory 201, to execute virtual instruction set architecture manager 210. In some implementations, processing device 205 and memory 201 may correspond to processing device 502 and main memory 504 respectively as described below with respect to FIG. 5.

Virtual instruction set architecture manager 210 may include instruction set configuration module 211, executable program generator 212, emulator generator 213, executable program provider 214, and emulator provider 215. Alternatively, the functionality of one or more of instruction set configuration module 211, executable program generator 212, emulator generator 213, executable program provider 214, and emulator provider 215 may be combined into a single module or divided into multiple sub-modules.

Instruction set configuration module 211 is responsible for configuring a set of instructions for a vISA (e.g., vISA instructions 202). As noted above, instruction set configuration module 211 can configure instructions for a specialized vISA that are optimized for correct and efficient emulation, binary translation, and binary optimization that is not coupled to a particular hardware architecture of a target system. In various implementations, the set of instructions may be configured based on instruction set functionalities of other known instruction set architectures. In other words, instruction set configuration module 211 can analyze ISA information from known hardware architectures and configure a set of instructions for a vISA in view of common functionality provided by the ISAs for known architectures.

In other implementations, the set of instructions or parameters for configuring the instructions may be received in part from an external source or configuration system. For example, the set of instructions for the vISA can be designed and generated manually by an instruction author (e.g., a developer, system administrator, or the like). The instructions can be provided to the external source or configuration system by the author. Subsequently, the set of instructions can be received by configuration module 211 from the external source or configuration system. In some implementations, configuration module 211 can receive the instructions from the author directly by providing a user interface that the author can use to provide the instructions.

In various implementations, instruction set configuration module 211 can configure instructions for the vISA to avoid any features that would be difficult to emulate correctly and efficiently (for example, instructions for transactional execution). Similarly, instruction set configuration module 211 can configure instructions with an instruction format and/or register layout that do not need to be fine-tuned for maximum space efficiency for a particular hardware architecture. In another example, the instructions can be configured to avoid side effects and undocumented behavior of instructions, which can simplify emulation since error handling of undocumented behavior can be avoided. In another example, the instructions can be configured to reduce the use of or avoid status registers (e.g., FLAGS, EFLAGS, RFLAGS, etc.) that are typically updated as a side-product, which can also simplify emulation of unnecessary instruction results.

In another example, the instructions can be configured to avoid conditional instructions and/or to include specialized call instructions (e.g., indicating a call ABI) in order to assist binary optimization. In another example, the instructions can be configured to include special instructions to invalidate modified code in order to assist efficient binary translation of self-modifying code. In another example, the instructions can be configured to include special instructions for frequently used operations (e.g., a MEMSET operation, a MEMMOVE operation, a MEMCOPY operation, etc.) and then directly mapped to optimized variants of those operations that are implemented in the target architecture. In other implementations, the set of instructions can be configured to include other types of instructions or operations.

In some implementations, instruction set configuration module 211 can configure the set of instructions by identifying an operation provided by the operating system of the target system in view of the ISA of the target system's hardware architecture. For example, instruction set configuration module 211 can identify an operation used by the operating system of the target system that is used to copy memory from one location to another. Instruction set configuration module 211 can then analyze the ISA to identify instructions that are invoked to perform the memory copy operation for that hardware architecture. Subsequently, instruction set configuration module 211 can configure an instruction for the vISA to provide the identified operation(s) (e.g., individual instructions to perform the memory copy). Instruction set configuration module 211 can then map the instruction for the vISA to one or more target instructions from the target ISA that perform the memory copy. For example, if the target ISA utilizes several instructions to perform the memory copy operation, Instruction set configuration module 211 can configure an instruction that performs a memory copy and map that instruction to the set of target ISA instructions that perform that operation. Thus, a single instruction in the vISA can be mapped to a set of instructions in the target ISA.

Executable program generator 212 is responsible for generating an executable program component (e.g., program 204) using the vISA for a particular operating system type (e.g., Linux, Windows, MacOS, etc.). In various implementations, executable program generator 212 can generate the executable program component by compiling the source code of the program into a binary executable. Alternatively, executable program generator 212 can invoke an external compiler component to perform some or all of these operations.

In some implementations, executable program generator 212 can generate the executable program component by configuring an application binary interface (ABI) specification for the vISA, where the ABI specification includes a communication interface between the vISA and the particular operating system type. For example, when generating an executable program to be executed within a Linux operating system environment, the executable program generator 212 can configure an ABI specification for the vISA that specifies the communication interface between the vISA and Linux. Executable program generator 212 can compile the source code for the program using the ABI specification for the vISA to create a compiled source code, and subsequently generate binary code for the compiled source code to create the executable program component.

In some implementations, the ABI can be configured based on functionalities of known communication interface architectures. In other words, executable program generator 212 can analyze information from known architectures and/or operating systems and configure the ABI in view of the analyzed information. For example, executable program generator 212 can analyze function calls for a particular operating system to determine the communication and/or function parameters passed by the functions to facilitate system calls for that operating system, where the parameters are passed (e.g., registers, memory locations, etc.), how the parameters are passed, or the like. Subsequently, executable program generator 212 can derive communication functionality with associated parameters for the ABA and configure the ABI with the derived functionality and communication parameters.

Alternatively, the ABI can be configured by receiving communication configuration parameters (e.g., parameters passed by functions to facilitate system calls for the operating system) from an external source or configuration system. For example, the communication configuration parameters can be generated by an instruction author (e.g., developer, system administrator, or the like). The communication configuration parameters can be provided by the instruction author to the external source or configuration system. Subsequently, the communication configuration parameters can be received by executable program generator 212 from the external source or configuration system. In some implementations, executable program generator 212 can receive the communication configuration parameters from the author directly by providing a user interface that the author can use to provide the communication configuration parameters.

Emulator generator 213 is responsible for generating an emulator component for the vISA (e.g., emulator 205). As noted above, the emulator component can be configured to perform emulation as well as binary translation of the vISA instructions on the hardware of the target system. As noted above, the vISA is configured with an instruction set for a virtual architecture that is different from the instruction set architecture of the target system. In various implementations, the emulator component can be configured to execute on a target computing system with a target ISA (e.g., the ISA of the target system hardware architecture), where the target computing system executes the same operating system as that of the compiled program. Accordingly, the emulator component generated by emulator generator 213 can be configured for use by a target system executing the same type of operating system as that considered by executable program generator 212 when compiling the executable program component. For example, if executable program generator 212 compiles the program with the vISA for execution by the Linux operating system, emulator generator 213 can generate the emulator component to be used by target systems executing Linux.

In various implementations, emulator generator 213 can generate the emulator component 205 by configuring an application binary interface (ABI) specification for the vISA, where the ABI specification defines a communication interface between the vISA and the type of operating system within which the emulator is intended to execute. Thus, if the emulator is intended to support executable programs executing within the Linux operating system, emulator generator 213 can generate the emulator component 205 such that the ABI for the vISA defines communication between the vISA and the Linux operating system. Once the ABI has been configured, emulator generator 213 can compile source code for the emulator component using the ABI specification for the vISA to create a compiled source code, and subsequently generate a binary code for the emulator component associated with the vISA using the compiled source code of the emulator.

In various implementations, emulator generator 213 can define a mapping and/or conversion format between the ABI for the vISA and the ABI for the target architecture (target ISA). For example, emulator generator 213 can map a vISA Linux ABI to an x86 Linux ABI. Subsequently, emulator generator 213 can define a binary translation mapping between the vISA and the target architecture (target ISA). In some implementations, the mappings can be defined by analyzing the ABI for the vISA with respect to the ABI for the target architecture. Alternatively, the mappings can be defined from an external source or configuration system. For example, the mappings can be determined and generated by an instruction author (e.g., a developer, system administrator, or the like), and provided by the author to the external source or configuration system. Subsequently, the mappings can be received by emulator generator 213 from the external source or configuration system. In some implementations, emulator generator 213 can receive the mappings from the author directly by providing a user interface that the author can use to provide the mappings.

In various implementations, emulator generator 213 can generate an emulator component 205 for multiple target system architectures to which the executable program 204 is to be distributed. For example, if the executable program is to be distributed to a target system with an x86 hardware architecture and a PowerPC hardware architecture, emulator generator 213 can generate a separate emulator component 205 for each target ISA (e.g., one for the x86 target system and one for the PowerPC target system). Each emulator component 205 can be configured to emulate the vISA instructions for its intended target system ISA. Thus, a program 204 that is compiled with the vISA for a particular operating system type can be distributed to any target system for which vISA emulator has been configured without involving recompiling program 204 for each particular target system. Program 204 can be compiled once for the vISA and operating system type, and subsequently distributed for use to any target system with a configured vISA emulator.

The emulator can be universally usable since it emulates and/or translates the expected behavior of each and every instruction for the vISA. In some instances, instead of or in addition to emulating the effect of each and every instruction, the emulator component can perform binary translation of one or more instructions to produce code for the target architecture. For example, for an x86 target architecture, the emulator component can be configured to support x86, producing a mapping from the virtual instruction to the x86 instruction. Additionally, the emulator component would translate the OS ABI of the vISA defined for selected operating system to the x86 Linux ABI of the target system.

Executable program provider 214 is responsible for providing the executable program 204 to the target system. Emulator provider 215 is responsible for providing the emulator 205 to the target system. In various implementations, executable program provider 214 and emulator provider 215 can be components of a software deployment pipeline that distributes software to target systems for execution. As noted above, the executable program provider 214 and emulator provider 215 can be components of a software distribution pipeline, a software package manager (e.g., such as Red Hat Package Manager, or the like), or other similar software deployment Process. Alternatively, executable program provider 14 and/or emulator provider 215 can provide the executable program 204 and emulator component 205 directly to the target system via file transfer, can make the components available on a shared storage platform (e.g., cloud storage) for retrieval by the target system, or the like.

Once the executable program component 204 and emulator component 205 have been deployed to the target system, the emulator component 204 can be configured to execute responsive to the operating system of the target system detecting a request to execute the executable program component 204. Thus, an indication that the executable program component 204 has been initiated can signal the target operating system to attempt to execute the program. The operating system can detect that the program has been compiled to use the vISA and, in response, can identify the emulator component on the target system that has been configured to emulate/binary translate the instructions for that vISA. The operating system can then invoke the emulator to execute the program.

The emulator component can emulate the vISA for the instructions in the executable program. In some implementations, the emulator component can translate been the ABI specification for the vISA and the ABI for ISA of the target system with respect to the operating system for which both were implemented. As an instruction is translated, the emulator component can initiate the appropriate system call for the operating system of the target system in view of the results of the translation.

In some implementations, to optimize efficiency, the emulator component can perform binary translation of an instruction rather than emulate the instruction. In such instances, the emulator component can identify an instruction in the program to be translated for the ISA of the target system. The emulator component can generate translated binary code for that instruction using information from the ISA of the target system, and execute that translated binary code.

When the emulator component utilizes instruction emulation, it attempts to simulate the behavior of the vISA for the target architecture. In such instances, the emulator analyzes each instruction separately. In binary translation, the emulator component analyzes consecutive blocks of vISA instructions and determines whether the block of instructions can be translated into an equivalent instruction or set of instructions on the target architecture without emulating each instruction separately. The translation can be performed once and stored in a memory cache so that any subsequent attempt to perform the same set of vISA instructions can cause the emulator component to reuse the translation stored in the cache.

Figure 3:
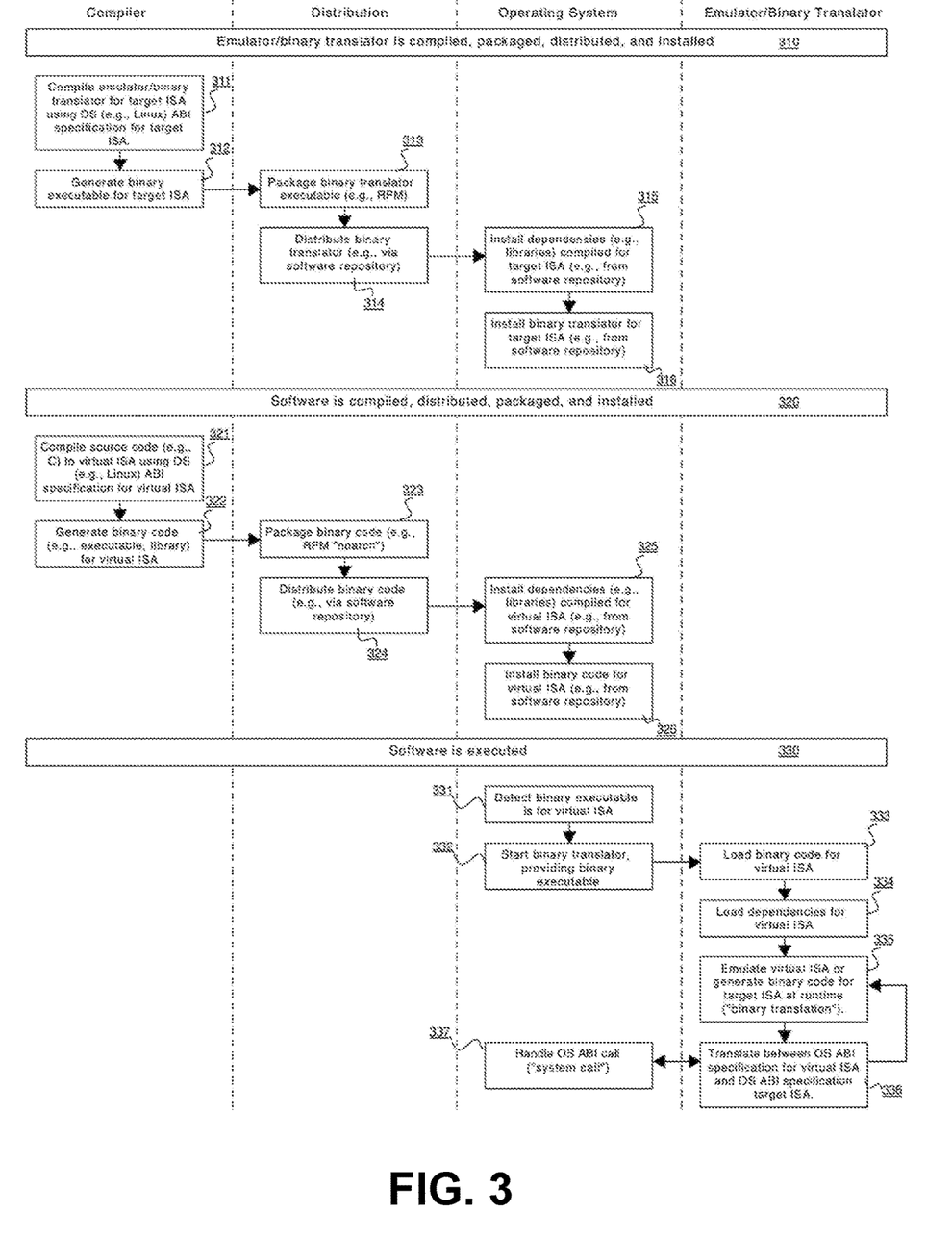
FIG. 3 depicts a sequence diagram illustrating an example of cross-architecture software distribution using a virtual instruction set architecture, in accordance with one or more aspects of the present disclosure.

FIG. 3 depicts a sequence diagram illustrating an example of cross-architecture software distribution using a virtual instruction set architecture. It should be noted that while a particular sequence is depicted, in other implementations the operations depicted could be performed in a different order. Additionally, some operations depicted in FIG. 3 could be divided into multiple operations. Similarly, some groups of operations could be combined into a single operation. In various implementations, the operations described in FIG. 3 can be performed by a virtual instruction set architecture manager such as the virtual instruction set manager 115 in FIG. 1 and/or the virtual instruction set manager 210 in FIG. 2.

As shown in FIG. 3, the software distribution process can include three phases: phase 310 that is directed to the compilation, packaging, distribution, and installation of the emulator/binary translator component for a vISA; phase 320 that is directed to the compilation, distribution, packaging, and installation of an executable program utilizing the vISA, and phase 330 that is directed to the execution of the program by the target system using the emulator/binary translator component. As shown in FIG. 3, references to "emulator", "emulator/binary translator", and "binary translator" all refer to the emulator component as described above with respect to FIGS. 1-2.

During phase 310, the emulator/binary translator component is prepared and distributed to the target system. As shown, at operation 311, the compiler of the source system compiles the vISA emulator/binary translator for the target ISA using the operating system (OS) ABI specification for the ISA of the target system. At operation 312, the compiler of the source system generates the binary executable for the ISA of the target system. At operation 313, the software package manager process (such as Red Hat Package Manager (RPM) or other analogous distribution process/deployment pipeline) packages the emulator/binary translator component executable for distribution to the target system. At operation 314, the software package manager distributes the emulator/binary translator component to the target system (e.g., via a software repository). At operation 315, the operating system of the target system receives the emulator/binary translator component and installs system dependencies for the emulator/binary translator component (e.g., libraries compiled for the target ISA) from the software repository. At operation 316, the operating system of the target system installs the emulator/binary translator component for the target ISA.

During phase 320, the executable program configured to use the vISA is prepared and distributed to the target system. As shown, at operation 321, the compiler of the source system compiles the source code of the program to the vISA using the operating system (OS) ABI specification for the vISA. At operation 322, the compiler of the source system generates the binary code for the executable program using the vISA. At operation 323, the software package manager process (such as Red Hat Package Manager (RPM) or other analogous distribution process/deployment pipeline) packages the executable program component for distribution to the target system. At operation 324, the software package manager distributes the executable program component to the target system (e.g., via a software repository). At operation 325, the operating system of the target system receives the executable program component and installs system dependencies for the executable program component (e.g., libraries compiled for the vISA) from the software repository. At operation 326, the operating system of the target system installs the executable program component for the vISA.

During phase 330, the executable program configured to use the vISA is executed on the target system using the emulator/binary translator component. As shown, at operation 331, the operating system of the target system receives a request to execute the executable program component and detects that the binary executable for the program component is associated with a vISA. At operation 332, the operating system of the target system invokes the emulator/binary translator component and provides the executable program to the emulator/binary translator component. At operation 333, the emulator/binary translator component loads the binary code for the vISA. At operation 334, the emulator/binary translator component loads any system dependency libraries for the vISA (e.g., into memory accessible to the emulator/binary translator component).

At operation 335, the emulator/binary translator component emulates the vISA for the target architecture. In some instances, the emulator/binary translator component can determine whether an instruction can be executed using binary translation rather than emulation. In such instances, the emulator/binary translator component generates binary code for the target ISA at runtime. If, at runtime, the emulator/binary translator component determines that binary translation of the instruction (or instructions) cannot be completed because the target ISA lacks particular hardware features that are needed by the instruction, the emulator/binary translator component can fallback to emulation of the instruction.

At operation 336, the emulator/binary translator component translates between the OS ABI specification for the vISA and the OS ABI specification for the target ISA. In various implementations, the emulator/binary translator can translate between the ABIs while the executable program is executing. For example, the vISA may include a Linux system call, and the emulator/binary translator component could translate that system call as defined by the vISA into an actual system call for the Linux OS executing on the architecture of the target system. Notably, this translation occurs between versions/implementations of the same OS that are present on different hardware architectures (e.g., between "flavors" of Linux). Subsequently, a system call is initiated by the emulator/binary translator, and at operation 337, the system call is handled by the operating system of the target system.

Figure 4:
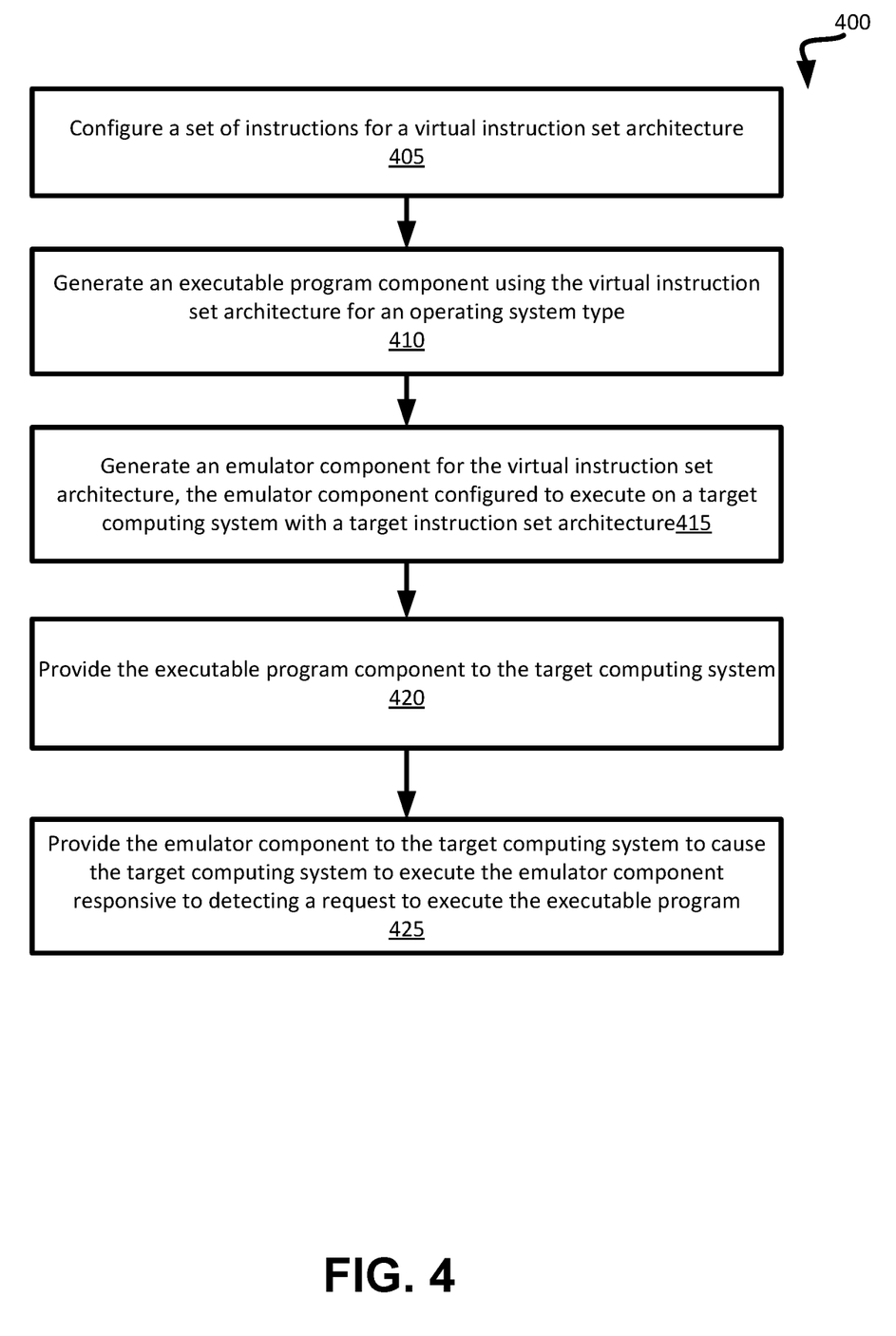
FIG. 4 depicts a flow diagram of a method for facilitating cross-architecture software distribution using a virtual instruction set architecture, in accordance with one or more aspects of the present disclosure.

FIG. 4 depicts a flow diagram of an example method 400 for facilitating cross-architecture software distribution using a virtual instruction set architecture. The method may be performed by processing logic that may comprise hardware (circuitry, dedicated logic, etc.), computer readable instructions (run on a general purpose computer system or a dedicated machine), or a combination of both. In an illustrative example, method 400 may be performed by virtual instruction set architecture manager 115 in FIG. 1 and/or the virtual instruction set manager 210 in FIG. 2. Alternatively, some or all of method 400 might be performed by another module or machine. It should be noted that blocks depicted in FIG. 4 could be performed simultaneously or in a different order than that depicted.

Figure 5:
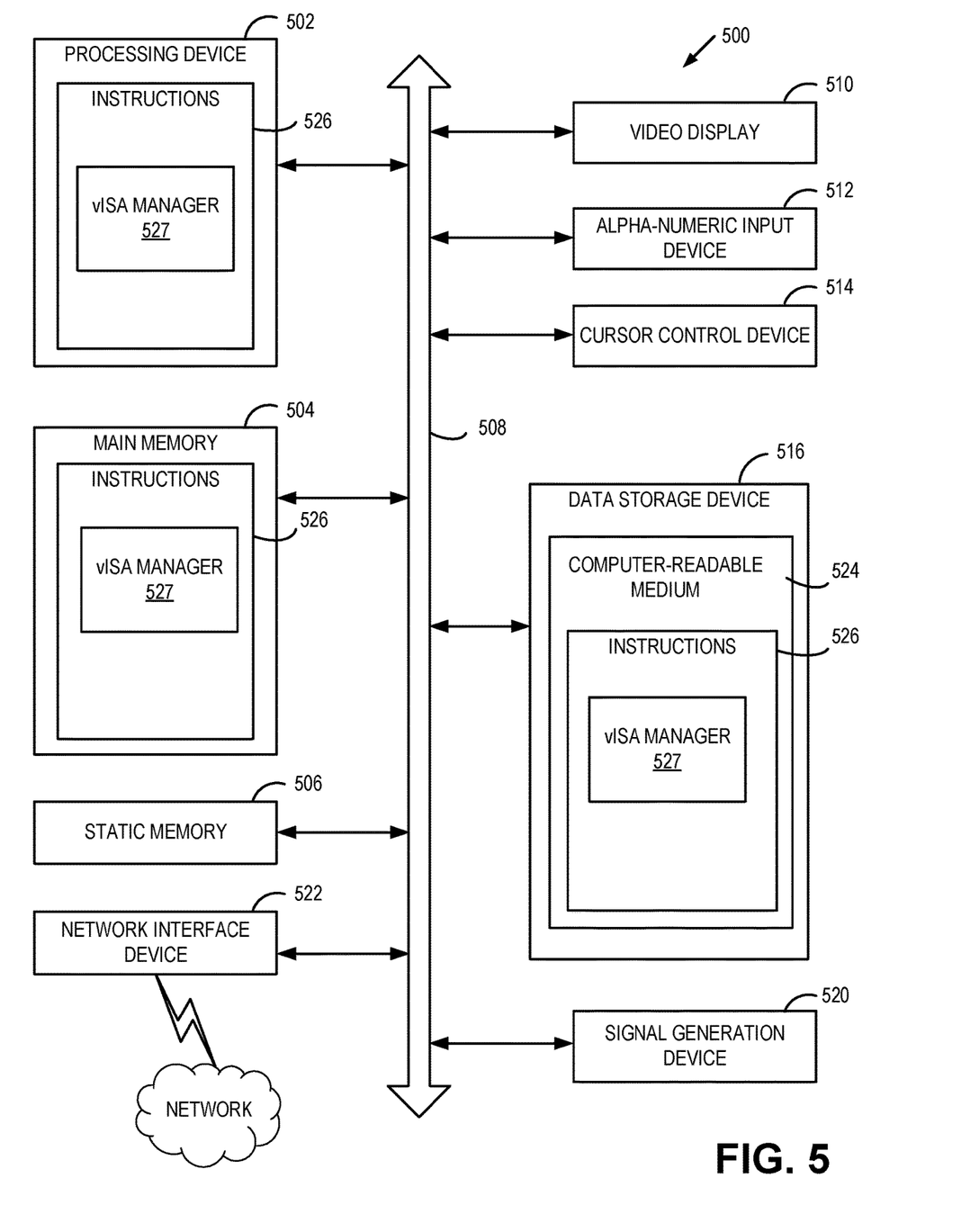
FIG. 5 depicts a block diagram of an illustrative computer system operating in accordance with one or more aspects of the present disclosure.

At block 405, processing logic configures a set of instructions for a virtual instruction set architecture. At block 410, processing logic generates an executable program component using the virtual instruction set architecture for an operating system type. At block 415, processing logic generates an emulator component for the virtual instruction set architecture, the emulator component configured to execute on a target computing system with a target instruction set architecture, wherein the target computing system executes the operating system type, and wherein the target instruction set architecture is different from the virtual instruction set architecture. At block 420, processing logic provides the executable program to the target computing system. At block 425, processing logic provides the emulator component to the target computing system to cause the target computing system to execute the emulator component responsive to detecting a request to execute the executable program FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes virtual instruction set architecture manager 527 for performing the operations and steps discussed herein (e.g., corresponding to virtual instruction set architecture manager 115 of FIG. 1, and the method of FIG. 4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that includes virtual instruction set architecture manager 527 for performing the operations and steps discussed herein (e.g., corresponding to virtual instruction set architecture manager 115 of FIG. 1, and the method of FIG. 4, etc.) embodying any one or more of the methodologies or functions described herein. Virtual instruction set architecture manager 527 may also reside, completely or at least partially, within the main memory 504 and/or within the processing device 502 during execution thereof by the computer system 500, the main memory 504 and the processing device 502 also constituting computer-readable media. Virtual instruction set architecture manager 527 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "configuring," "generating," "providing," "executing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
configuring, by a host computer system, a set of instructions for a virtual instruction set architecture;
generating an executable program component using the virtual instruction set architecture for an operating system type;
generating an emulator component for the virtual instruction set architecture, the emulator component configured to execute on a target computing system with a target instruction set architecture, wherein the target computing system executes the operating system type, and wherein the target instruction set architecture is different from the virtual instruction set architecture;
providing the executable program component to the target computing system; and
providing the emulator component to the target computing system to cause the target computing system to execute the emulator component responsive to detecting a request to execute the executable program.

2. The method of claim 1, further comprising:
generating a second emulator component for the virtual instruction set architecture, the second emulator component configured to execute on a second target computing system with a second target instruction set architecture, wherein the second target computing system executes the operating system type, and wherein the second target instruction set architecture is different from the target instruction set architecture;
providing the executable program to the second target computing system; and
providing the second emulator component to the second target computing system to cause the second target computing system to execute the second emulator component responsive to detecting a request to execute the executable program.

3. The method of claim 1, further comprising:
configuring an application binary interface (ABI) specification for the virtual instruction architecture, wherein the ABI specification comprises a communication interface between the virtual instruction set architecture and the operating system type.

4. The method of claim 3, further comprising:
compiling a source code using the ABI specification for the virtual instruction set architecture to create a compiled source code; and
generating a binary code for the compiled source code in view of the virtual instruction set architecture.

5. The method of claim 1, further comprising:
identifying an operation provided by the operating system type in view of the target instruction set architecture;
configuring a first instruction for the virtual instruction set architecture, the first instruction to provide the identified operation; and
mapping the first instruction to one or more target instructions from the target instruction set architecture.

6. The method of claim 1, further comprising:
receiving an ABI specification for the target instruction set architecture that comprises a communication interface between the target instruction set architecture and the operating system type;
compiling a source code for the emulator component using the ABI specification for the target instruction set architecture to create a compiled source code; and
generating a binary code for the compiled source code in view of the target instruction set architecture.

7. The method of claim 1, wherein the emulator component is to:
receiving a notification from the target computing system to execute the executable program, the notification indicating that the executable program is associated with the virtual instruction set architecture;
emulating the virtual instruction set architecture for at least one instruction in the executable program;
translating between an ABI specification for the virtual instruction set architecture and an ABI for the target instruction set architecture; and
initiating an OS system call on the target computing system in view of the translation.

8. The method of claim 7, further comprising:
identifying an additional instruction in the executable program to be translated for the target instruction set architecture;
generating translated binary code for the additional instruction in view of the target instruction set architecture;
executing the translated binary code.

9. A system comprising:
a memory; and
a processing device, operatively coupled to the memory, the processing device to:
configure a set of instructions for a virtual instruction set architecture;
generate an executable program component using the virtual instruction set architecture for an operating system type;
generate an emulator component for the virtual instruction set architecture, the emulator component configured to execute on a target computing system with a target instruction set architecture, wherein the target computing system executes the operating system type, and wherein the target instruction set architecture is different from the virtual instruction set architecture; and provide the executable program and the emulator component to the target computing system to cause the target computing system to execute the emulator component responsive to detecting a request to execute the executable program.

10. The system of claim 9, wherein the processing device is further to:

generate a second emulator component for the virtual instruction set architecture, the second emulator component configured to execute on a second target computing system with a second target instruction set architecture, wherein the second target computing system executes the operating system type, and wherein the second target instruction set architecture is different from the target instruction set architecture; and provide the executable program and the second emulator component to the second target computing system to cause the second target computing system to execute the second emulator component responsive to detecting a request to execute the executable program.

11. The system of claim 9, wherein the processing device is further to:

configure an application binary interface (ABI) specification for the virtual instruction architecture, wherein the ABI specification comprises a communication interface between the virtual instruction set architecture and the operating system type;

compile a source code using the ABI specification for the virtual instruction set architecture to create a compiled source code; and generate a binary code for the compiled source code in view of the virtual instruction set architecture.

12. The system of claim 9, wherein the processing device is further to:

identify an operation provided by the operating system type in view of the target instruction set architecture;

configure a first instruction for the virtual instruction set architecture, the first instruction to provide the identified operation; and map the first instruction to one or more target instructions from the target instruction set architecture.

13. The system of claim 9, wherein the processing device is further to:

receive an ABI specification for the target instruction set architecture that comprises a communication interface between the target instruction set architecture and the operating system type;

compile a source code for the emulator component using the ABI specification for the target instruction set architecture to create a compiled source code; and generate a binary code for the compiled source code in view of the target instruction set architecture.

14. The system of claim 9, wherein the processing device is further to:

receive a notification from the target computing system to execute the executable program, the notification indicating that the executable program is associated with the virtual instruction set architecture;

emulating the virtual instruction set architecture for at least one instruction in the executable program;

translating between an ABI specification for the virtual instruction set architecture and an ABI for the target instruction set architecture; and initiating an OS system call on the target computing system in view of the translation.

15. A non-transitory computer readable medium comprising instructions, which when accessed by a processing device, cause the processing device to:

configure a set of instructions for a virtual instruction set architecture;

generate an executable program component using the virtual instruction set architecture for an operating system type;

generate an emulator component for the virtual instruction set architecture, the emulator component configured to execute on a target computing system with a target instruction set architecture, wherein the target computing system executes the operating system type, and wherein the target instruction set architecture is different from the virtual instruction set architecture; and provide the executable program and the emulator component to the target computing system to cause the target computing system to execute the emulator component responsive to detecting a request to execute the executable program.

16. The non-transitory computer readable medium of claim 15, wherein the processing device is further to:

generate a second emulator component for the virtual instruction set architecture, the second emulator component configured to execute on a second target computing system with a second target instruction set architecture, wherein the second target computing system executes the operating system type, and wherein the second target instruction set architecture is different from the target instruction set architecture; and provide the executable program and the second emulator component to the second target computing system to cause the second target computing system to execute the second emulator component responsive to detecting a request to execute the executable program.

17. The non-transitory computer readable medium of claim 15, wherein the processing device is further to:

configure an application binary interface (ABI) specification for the virtual instruction architecture, wherein the ABI specification comprises a communication interface between the virtual instruction set architecture and the operating system type;

compile a source code using the ABI specification for the virtual instruction set architecture to create a compiled source code; and generate a binary code for the compiled source code in view of the virtual instruction set architecture.

18. The non-transitory computer readable medium of claim 15, wherein the processing device is further to:

identify an operation provided by the operating system type in view of the target instruction set architecture;

configure a first instruction for the virtual instruction set architecture, the first instruction to provide the identified operation; and map the first instruction to one or more target instructions from the target instruction set architecture.

19. The non-transitory computer readable medium of claim 15, wherein the processing device is further to:

receive an ABI specification for the target instruction set architecture that comprises a communication interface between the target instruction set architecture and the operating system type;

compile a source code for the emulator component using the ABI specification for the target instruction set architecture to create a compiled source code; and generate a binary code for the compiled source code in view of the target instruction set architecture.

20. The non-transitory computer readable medium of claim 15, wherein the processing device is further to:

receive a notification from the target computing system to execute the executable program, the notification indicating that the executable program is associated with the virtual instruction set architecture;

emulating the virtual instruction set architecture for at least one instruction in the executable program;

translating between an ABI specification for the virtual instruction set architecture and an ABI for the target instruction set architecture; and initiating an OS system call on the target computing system in view of the translation.

\* \* \* \* \*